(12) United States Patent
Blain

(10) Patent No.: US 9,651,349 B2
(45) Date of Patent: May 16, 2017

(54) BRAKE-SHOE TOOL FOR USE WITH BRAKE-SHOE LINING

(71) Applicant: Darcy Blain, Innisfail (CA)

(72) Inventor: Darcy Blain, Innisfail (CA)

( * ) Notice: Subject to any disclaimer, the term of this patent is extended or adjusted under 35 U.S.C. 154(b) by 59 days.

(21) Appl. No.: 14/828,253

(22) Filed: Aug. 17, 2015

(65) Prior Publication Data

US 2017/0052012 A1    Feb. 23, 2017

(51) Int. Cl.
*G01B 3/30* (2006.01)
*F16D 65/00* (2006.01)

(52) U.S. Cl.
CPC ........... *G01B 3/30* (2013.01); *F16D 65/0043* (2013.01)

(58) Field of Classification Search
CPC .............................. G01B 3/30; F16D 65/0043
USPC ............................................................ 33/610
See application file for complete search history.

(56) References Cited

U.S. PATENT DOCUMENTS

| | | | | |
|---|---|---|---|---|
| 552,238 | A * | 12/1895 | Darling | G01B 3/40 |
| | | | | 33/199 R |
| 867,011 | A * | 9/1907 | Bromley | G01B 5/22 |
| | | | | 33/501 |
| 1,860,174 | A | 5/1932 | Cronk | |
| 3,011,262 | A | 12/1961 | Allen et al. | |
| 3,073,035 | A | 1/1963 | Thomason | |
| 3,115,709 | A | 12/1963 | Litchfield | |
| 3,660,905 | A | 5/1972 | McFarland et al. | |
| 3,703,826 | A | 11/1972 | Burke | |
| 4,283,858 | A * | 8/1981 | Sobczak | G01B 3/14 |
| | | | | 33/555.2 |
| 4,517,747 | A * | 5/1985 | Morin | A61B 3/107 |
| | | | | 33/512 |
| 5,617,644 | A * | 4/1997 | Bonelli | A24F 47/00 |
| | | | | 33/548 |
| 5,870,835 | A | 2/1999 | Stieff | |
| 5,975,250 | A | 11/1999 | Brandmeier et al. | |
| 6,047,606 | A * | 4/2000 | Sibole | G01B 3/34 |
| | | | | 33/501.08 |
| 6,279,241 | B1 * | 8/2001 | Chen | G01B 3/30 |
| | | | | 33/199 R |
| 6,931,744 | B1 * | 8/2005 | Ikerd, Jr. | F16D 65/0043 |
| | | | | 33/501.45 |
| 7,032,413 | B1 * | 4/2006 | Specktor | D04B 3/00 |
| | | | | 33/555.2 |

(Continued)

FOREIGN PATENT DOCUMENTS

| | | |
|---|---|---|
| CA | 2287550 | 4/2001 |
| CA | 2518538 | 7/2006 |
| CN | 202329459 | 7/2012 |

*Primary Examiner* — Yaritza Guadalupe-McCall
(74) *Attorney, Agent, or Firm* — Giuseppe Mariconda

(57) ABSTRACT

A brake-shoe tool is for use with a brake-shoe lining. The brake-shoe tool includes an elongated rigid linear shaft assembly and a plurality of rigid flat plate members each rotatably mounted to the elongated rigid linear shaft assembly. Each of the rigid flat plate members includes a flat planar surface in rotating contact arrangement with a neighboring instance of the flat planar surface. A free end extends from the flat planar surface. The free end presents an elongated edge having a unique length. The elongated edge is configured to be positioned adjacent to a thickness of the brake-shoe lining in such a way that each instance of the elongated edge is positionable to and visually comparable against the thickness of the brake-shoe lining.

8 Claims, 4 Drawing Sheets

(56) References Cited

U.S. PATENT DOCUMENTS

| | | | |
|---|---|---|---|
| 7,607,237 B2* | 10/2009 | Schafer | G01B 3/34 33/501.45 |
| 7,845,091 B2 | 12/2010 | Clark | |
| 8,915,128 B2 | 12/2014 | Tucker | |
| 8,973,281 B1* | 3/2015 | Fiquette | G01B 3/002 33/501.45 |
| 9,500,462 B2* | 11/2016 | Reble | G01B 3/30 |
| 2001/0011421 A1* | 8/2001 | Bakke | G01B 3/34 33/501.45 |
| 2010/0101378 A1* | 4/2010 | Thompson | F16D 65/0043 81/119 |
| 2014/0139332 A1 | 5/2014 | Mouchet | |
| 2014/0259719 A1 | 9/2014 | Thorley et al. | |
| 2016/0084626 A1* | 3/2016 | Reble | G01B 5/0028 33/609 |
| 2016/0084627 A1* | 3/2016 | Reble | G01B 5/0028 33/609 |

* cited by examiner

BRAKE-SHOE TOOL FOR USE WITH BRAKE-SHOE LINING

TECHNICAL FIELD

This document relates to the technical field of (and is not limited to) a brake-shoe tool for use with a brake-shoe lining.

BACKGROUND

Brake pads are a component of disc (disk) brakes (used in or by a vehicle such as, a truck, etc.). Brake pads are steel backing plates with friction material bound to the surface that faces a disk brake rotor (which is a type of brake assembly) or a brake drum (which is another type of brake assembly. Brake pads are configured to convert the kinetic energy of a moving vehicle to thermal energy by friction. Two brake pads are contained in a brake caliper with their friction surfaces facing the disk brake rotor. When the brakes (of the vehicle) are hydraulically applied, the caliper clamps or squeezes the brake pads together into the spinning rotor to slow and/or stop the movement of the vehicle. When a brake pad is heated by contact with a rotor, the brake pad transfers small amounts of friction material to the disc, turning the brake pad dull gray. The brake pad and disc (both may have friction material) are configured to stick (in use) to each other, thereby providing the friction that stops movement of the vehicle.

SUMMARY

It will be appreciated that there exists a need to mitigate (at least in part) at least one problem associated with the existing system for determining brake pad wear (also called the existing technology). After much study of the known systems and methods with experimentation, an understanding of the problem and its solution has been identified and is articulated as follows:

Brake pads in vehicles are prone to frictional wear. The pads wear because of vehicle usage and require periodic replacement. An inspection of the brake pads requires removal of the wheel from the vehicle hub in order to determine pad wear condition. Pad wear may result in inconvenience and extreme expense, and may result in brake failure (leading to a vehicular accident).

The existing technology provides a brake wear indicator configured to warn the user and/or owner of a vehicle that the brake pad is in need of replacement.

However, once the vehicle arrives into the repair shop, the mechanic (repair person) needs to confirm the condition of the brake pad as quickly as possible, so that inspection costs are kept relatively lower.

What is needed is a tool configured to determine the degree of brake pad wear without requiring removal of the vehicle wheel. The advantage of this tool is an improved (quicker, relatively easier, more effective, etc.) inspection of the brake pad.

To mitigate, at least in part, at least one problem associated with the existing technology, there is provided (in accordance with a major aspect) a brake-shoe tool for use with a brake-shoe lining. The brake-shoe tool includes an elongated rigid linear shaft assembly and a plurality of rigid flat plate members.

The rigid flat plate members each includes a bound end defining a shaft-receiving hole configured to extend through the bound end. The shaft-receiving hole (of each instance of the bound end of the plurality of rigid flat plate members) is configured to be aligned with each other. This is done in such a way that: (A) the elongated rigid linear shaft assembly is extendable through each instance of the shaft-receiving hole of each instance of the bound end once the shaft-receiving hole of each instance of the bound end is aligned with each other; and (B) the plurality of rigid flat plate members is held in rotatable arrangement with the elongated rigid linear shaft assembly.

A technical effect of the bound end and the elongated rigid linear shaft assembly is that the brake-shoe tool is made relatively easier to use by simply rotating toward (to) the desired instance of the rigid flat plate members.

The rigid flat plate members each includes a flat planar surface extending from the bound end. The flat planar surface (that is, the flat planar surface of each rigid flat plate member) is in rotating contact arrangement with a neighboring instance of the flat planar surface (once the instances of the bound end are rotatably mounted to the elongated rigid linear shaft assembly).

A technical effect of the rigid flat plate members is that the tool can be relatively compact and easy to carry in the pocket of the user.

The rigid flat plate members each includes a free end extending from the flat planar surface. The free end is spaced apart from the bound end. Each instance of the free end presents an elongated edge. The elongated edge has a unique predetermined length that is different from the unique predetermined lengths of the remaining instances of the elongated edge (of each instance of the free end of the remaining instances of the rigid flat plate members). Each instance of the elongated edge is configured to be positioned adjacent to a thickness of the brake-shoe lining that is exposed by the backing plate inspection hole. This is done in such a way that each instance of the elongated edge is positionable to and visually comparable against the thickness of the brake-shoe lining.

A technical effect of the rigid flat plate members is that the thickness of the brake-shoe lining may be easily determined by visual comparison of the elongated edges against the thickness of the brake-shoe lining.

It will be appreciated that brake-shoe tool may be used with any one of a disk brake (which is a type of brake assembly) or a brake drum (which is another type of brake assembly.

Other aspects are identified in the claims.

Other aspects and features of the non-limiting embodiments may now become apparent to those skilled in the art upon review of the following detailed description of the non-limiting embodiments with the accompanying drawings.

BRIEF DESCRIPTION OF THE DRAWINGS

The non-limiting embodiments may be more fully appreciated by reference to the following detailed description of the non-limiting embodiments when taken in conjunction with the accompanying drawings, in which.

Figure 1:
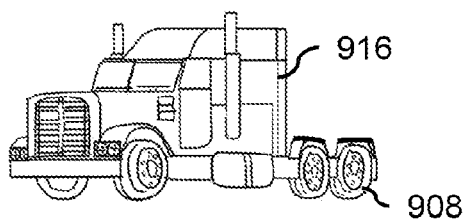
FIG. 1 (SHEET 1 OF 4 SHEETS) depicts a perspective view of an embodiment of a vehicle wheel attached to a movable vehicle.

The drawings are not necessarily to scale and may be illustrated by phantom lines, diagrammatic representations and fragmentary views. In certain instances, details unnecessary for an understanding of the embodiments (and/or details that render other details difficult to perceive) may have been omitted.

Corresponding reference characters indicate corresponding components throughout the several figures of the drawings. Elements in the several figures are illustrated for simplicity and clarity and have not been drawn to scale. The dimensions of some of the elements in the figures may be emphasized relative to other elements for facilitating an understanding of the various disclosed embodiments. In addition, common, but well-understood, elements that are useful or necessary in commercially feasible embodiments are often not depicted to provide a less obstructed view of the embodiments of the present disclosure.

LISTING OF REFERENCE NUMERALS USED IN THE DRAWINGS 100 brake-shoe tool
102 elongated rigid linear shaft assembly
104 rigid flat plate members
106 bound end
108 shaft-receiving hole
110 flat planar surface
112 free end
114 elongated edge
116 unique indicia
118 air gap
120 linear shaft portion
122 end caps
900 brake-shoe lining
902 brake drum
904 brake shoe
905 backing plate inspection hole
906 backing plate
908 vehicle wheel
911 user
912 vehicle tire
914 vehicle wheel rim
916 movable vehicle

DETAILED DESCRIPTION OF THE NON-LIMITING EMBODIMENT(S)

The following detailed description is merely exemplary and is not intended to limit the described embodiments or the application and uses of the described embodiments. As used, the word "exemplary" or "illustrative" means "serving as an example, instance, or illustration." Any implementation described as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure. The scope of the invention is defined by the claims. For the description, the terms "upper," "lower," "left," "rear," "right," "front," "vertical," "horizontal," and derivatives thereof shall relate to the examples as oriented in the drawings. There is no intention to be bound by any expressed or implied theory in the preceding Technical Field, Background, Summary or the following detailed description. It is also to be understood that the devices and processes illustrated in the attached drawings, and described in the following specification, are exemplary embodiments (examples), aspects and/or concepts defined in the appended claims. Hence, dimensions and other physical characteristics relating to the embodiments disclosed are not to be considered as limiting, unless the claims expressly state otherwise. It is understood that the phrase "at least one" is equivalent to "a". The aspects (examples, alterations, modifications, options, variations, embodiments and any equivalent thereof) are described regarding the drawings. It should be understood that the invention is limited to the subject matter provided by the claims, and that the invention is not limited to the particular aspects depicted and described.

FIG. 1 depicts a perspective view of an embodiment of a vehicle wheel 908 attached to a movable vehicle 916.

Figure 2A:
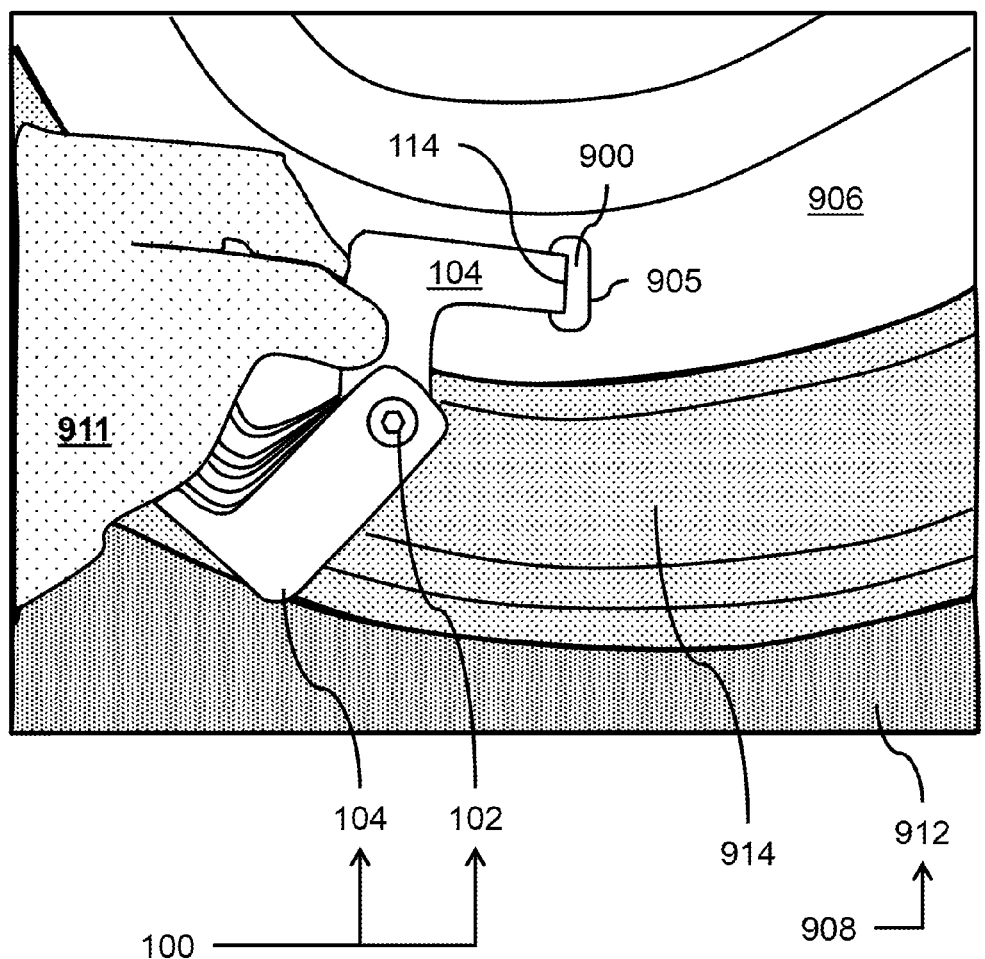
FIG. 2A (SHEET 1 OF 4 SHEETS) depicts a perspective view of an embodiment of a brake-shoe tool for use with the vehicle wheel of FIG. 1.
Figure 2B:
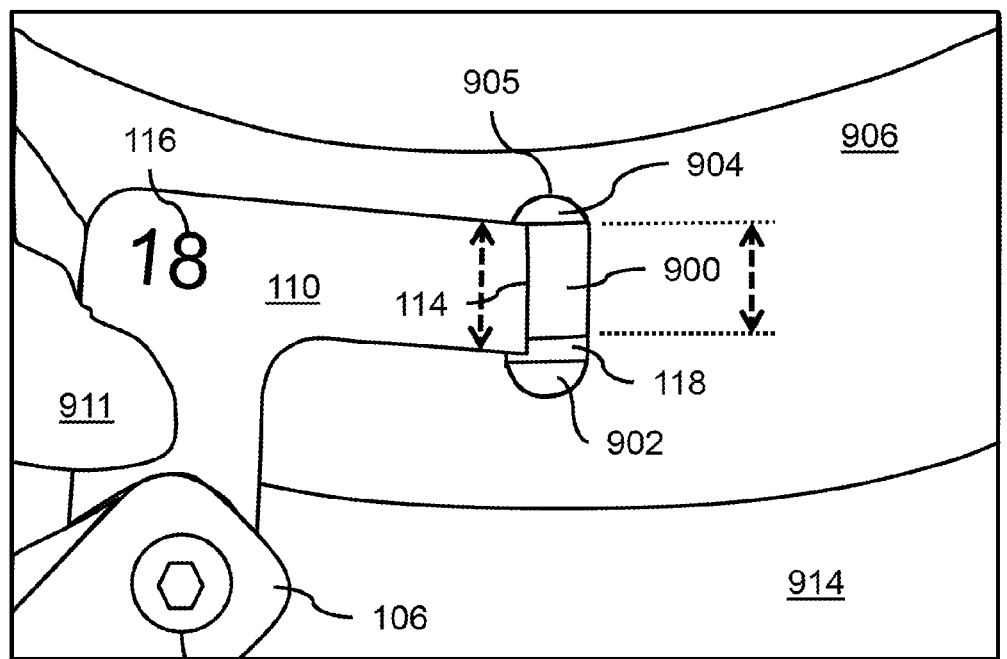
FIG. 2B (SHEET 2 OF 4 SHEETS) depicts a perspective close-up view of an embodiment of a brake-shoe tool for use with the vehicle wheel of FIG. 1.

FIG. 2A and FIG. 2B depict perspective views of embodiments of a brake-shoe tool 100 for use with the vehicle wheel 908 of FIG. 1. FIG. 2B depicts a close-up view of FIG. 2A.

Figure 2C:
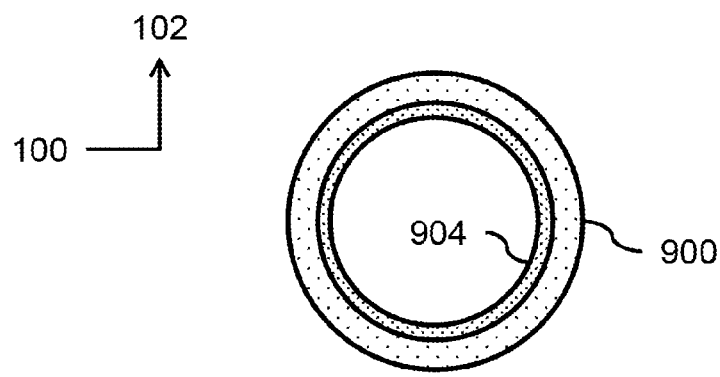
FIG. 2C (SHEET 2 OF 4 SHEETS) depicts a side view of a brake-shoe lining and a brake shoe for use with the brake-shoe tool of FIG. 2A.

FIG. 2C depicts a side view of a brake-shoe lining 900 and a brake shoe 904 for use with the brake-shoe tool 100 of FIG. 2A.

It will be appreciated that FIGS. 2, 2A, 2B and 2C depict embodiments of a brake drum 902 (which is a type of brake assembly). It will be appreciated that brake-shoe tool 100 may be used with any one of a disk brake (which is a type of brake assembly) or may be used with the brake drum 902 (which is another type of brake assembly).

For the brake drum, the vehicle wheel 908 is not removed from the movable vehicle 916 in order to gain access to the brake drum 902 (to take a measurement of the brake shoe 904 or to replace the brake shoe 904, which is also called a brake pad).

For the disk brake (not depicted but known), the vehicle wheel 908 is removed from the movable vehicle 916 in order to gain access to the disk brake (to take a measurement of the brake shoe 904 or to replace the brake shoe 904).

Referring to the embodiment as depicted in FIG. 2C, the brake-shoe lining 900 surrounds the outer perimeter of the brake shoe 904, and the brake shoe 904 is positioned within the brake-shoe lining 900.

Referring to the embodiment as depicted in FIG. 2A and FIG. 2B, the brake-shoe tool 100 is for use with a brake-shoe lining 900 configured to interact with a brake drum 902. The brake-shoe lining 900 may be called a brake pad, and is configured to wear out as a result of usage of the brakes of the movable vehicle 916 of FIG. 1

The brake-shoe lining 900 is also configured to be fixedly attachable to a brake shoe 904 (typically, this is a piece made of metal, such as steel). The brake shoe 904 is also called a web or a base. The brake drum 902 and the brake shoe 904 are configured to be covered by a backing plate 906 defining a backing plate inspection hole 905. The backing plate inspection hole 905 is configured to expose, at least in part, a portion of the brake drum 902 and the brake shoe 904. The backing plate 906 is included in the vehicle wheel 908 (as depicted in FIG. 1) having a vehicle tire 912. The vehicle tire 912 is attached to a vehicle wheel rim 914 of the movable vehicle 916 (as depicted in FIG. 1).

Figure 5A:
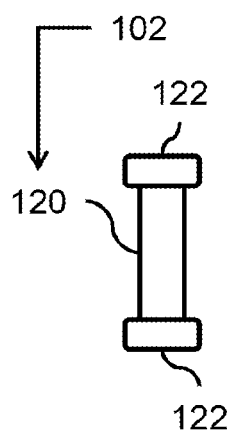
FIG. 5A and FIG. 5B (SHEET 4 OF 4 SHEETS) depict side views of embodiments of the brake-shoe tool of FIG. 2A.
Figure 5B:
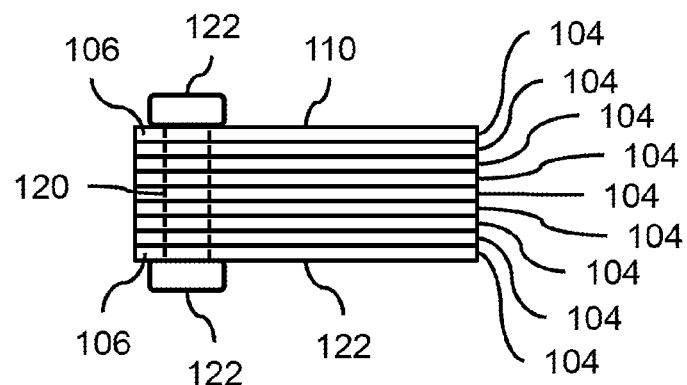

The brake-shoe tool 100 includes (and is not limited to) a synergistic combination of an elongated rigid linear shaft assembly 102 and a plurality of rigid flat plate members 104. A specific embodiment of the elongated rigid linear shaft assembly 102 is depicted in FIG. 5A and FIG. 5B.

The brake-shoe tool 100 is configured to measure the amount of any remaining portion of the brake shoe 904 (existing at the time of inspection). The brake-shoe tool 100 is configured to measure the thickness of the remaining amount of the brake shoe 904 with relative ease and accuracy (such as, for heavy truck and trailer inspections). The brake-shoe tool 100 makes inspection relatively easier.

Figure 3:
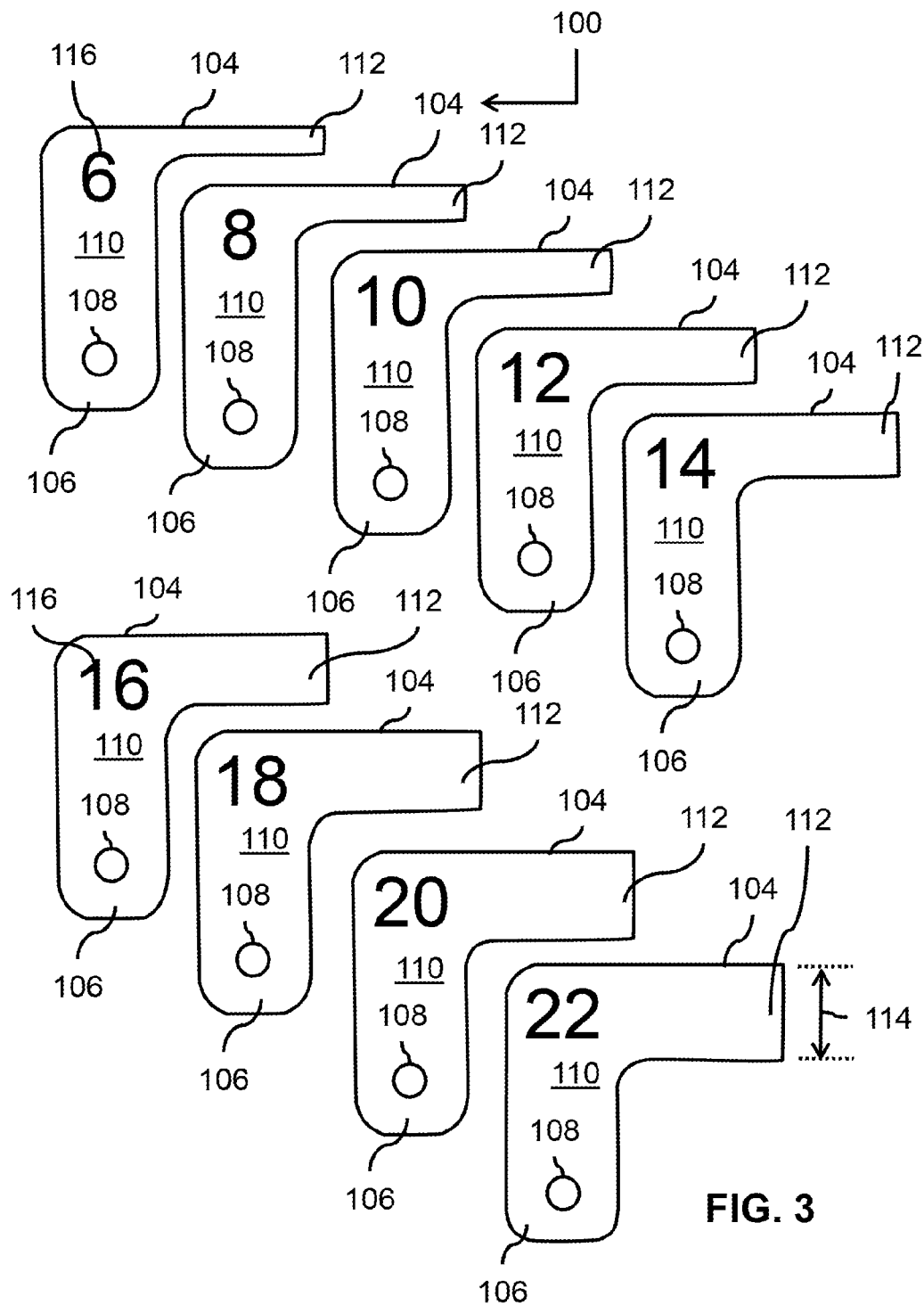
FIG. 3 (SHEET 3 OF 4 SHEETS) depicts an exploded view of an embodiment of the brake-shoe tool of FIG. 2A.

FIG. 3 depicts an exploded view of an embodiment of the brake-shoe tool 100 of FIG. 2A.

Referring to the embodiment as depicted in FIG. 3, the plurality of rigid flat plate members 104 each includes a bound end 106, a flat planar surface 110 and a free end 112.

Figure 4:
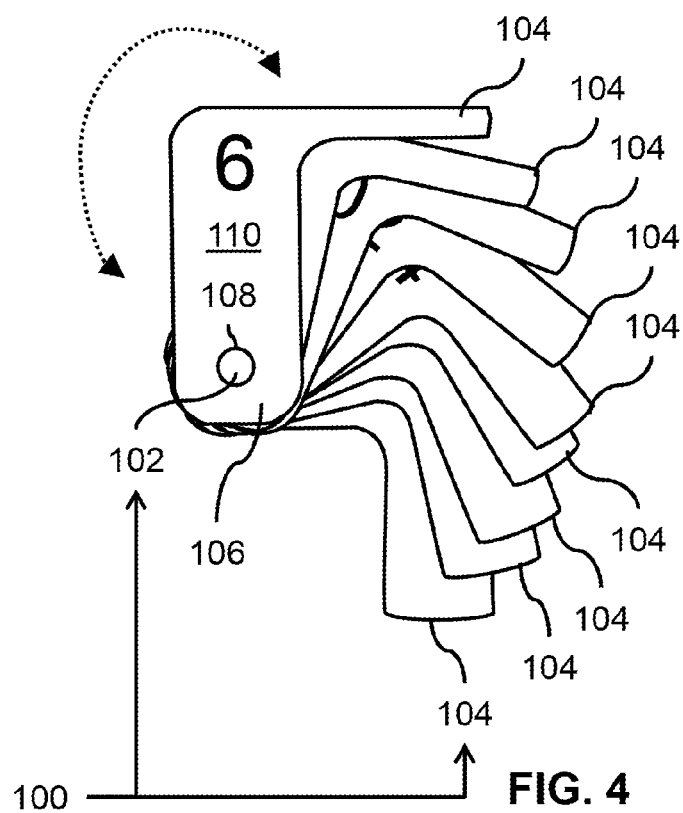
FIG. 4 (SHEET 4 OF 4 SHEETS) depicts a top view of an embodiment of the brake-shoe tool of FIG. 2A.

The bound end 106 defines a shaft-receiving hole 108. The shaft-receiving hole 108 is configured to extend through the bound end 106. The shaft-receiving hole 108 (of each instance of the bound end 106 of the plurality of rigid flat plate members 104) is configured to be aligned with each other (as depicted in FIG. 4 and FIG. 5B). This is done in such a way that the elongated rigid linear shaft assembly 102 is extendable through each instance of the shaft-receiving hole 108 of each instance of the bound end 106 once the shaft-receiving hole 108 of each instance of the bound end 106 is aligned with each other. In addition, this is done in such a way that the plurality of rigid flat plate members 104 is held in rotatable arrangement with the elongated rigid linear shaft assembly 102.

A technical effect of the bound end 106 and the elongated rigid linear shaft assembly 102 is that the tool is made relatively easier to use by simply rotating toward (to) the desired instance of the rigid flat plate members 104.

The flat planar surface 110 extends from the bound end 106. The flat planar surface 110 (the flat planar surface of each rigid flat plate member) is in rotating contact arrangement (as depicted in FIG. 4) with a neighboring instance of the flat planar surface 110 of once the instances of the bound end 106 are rotatably mounted to the elongated rigid linear shaft assembly 102 (as depicted in FIG. 4).

A technical effect of the rigid flat plate members 104 is that the brake-shoe tool 100 can be relatively compact and easy to carry in the pocket of the user 911.

The free end 112 extends from the flat planar surface 110. The free end 112 is spaced apart from the bound end 106. Each instance of the free end 112 presents an elongated edge 114. The elongated edge 114 has a unique predetermined length. The unique predetermined length of each instance of the elongated edge 114 is different from the remaining instances of the elongated edge 114 (of the remaining instances of the free end 112).

Each instance of the elongated edge 114 is configured to be positioned adjacent to a thickness of the brake-shoe lining 900 that is exposed by the backing plate inspection hole 905 (as depicted in FIG. 2A and FIG. 2B). This is done in such a way that each instance of the elongated edge 114 is positionable to and visually comparable against the thickness of the brake-shoe lining 900 while the vehicle wheel 908 remains operatively attached to the vehicle wheel rim 914.

By way of an option, the flat planar surface 110 includes a unique indicia 116 (preferably that is engraved or formed on the flat planar surface 110). In accordance with the embodiment as depicted in FIG. 2A, the unique indicia 116 provides a number "18", indicating that the length of the elongated edge 114 is about 18 millimeters (mm). Each of the rigid flat plate members 104 includes a unique instance of the unique indicia 116 (ranging from, for instance, about 6 mm to about 22 mm in about 2 mm steps). Each instance of the flat planar surface 110 includes a unique indicia 116 configured to indicate a unique length of the elongated edge 114 of the free end 112.

As depicted, the thickness of the brake-shoe lining 900 is less than 18 millimeters (once the elongated edge 114 is positioned against the thickness of the brake-shoe lining 900, as exposed by the backing plate inspection hole 905). There is an air gap 118 positioned between the edge of the brake drum 902 and the outer edge of the brake-shoe lining 900. The mechanic (user 911) may visually inspect the brake-shoe lining 900 for wear condition (preferably, without having to remove the vehicle wheel 908 from the movable vehicle 916 as depicted in FIG. 1).

A technical effect of the rigid flat plate members 104 is that the thickness of the brake-shoe lining 900 may be easily determined by visual comparison of the elongated edges 114 against the thickness of the brake-shoe lining 900.

FIG. 4 depicts a top view of an embodiment of the brake-shoe tool 100 of FIG. 2A.

Referring to the embodiment as depicted in FIG. 4, each member of the plurality of rigid flat plate members 104 define an L-shaped configuration. More specifically, each instance of the rigid flat plate member 104 defines an L-shaped configuration. The free end 112 is configured to form a right-angled portion (that is, the free end forms right-angled section or a right-angled section). Generally, the rigid flat plate members 104 form a right-angled section or a right-angled portion. Each of the rigid flat plate members 104 is configured to fan out (as depicted in FIG. 4) once the user moves (pivotally moves) the rigid flat plate members 104 just so relative to the elongated rigid linear shaft assembly 102.

FIG. 5A and FIG. 5B depict side views of embodiments of the brake-shoe tool 100 of FIG. 2A.

Referring to the embodiment as depicted in FIG. 5A, the elongated rigid linear shaft assembly 102 includes a linear shaft portion 120 with end caps 122 positioned on opposite sides of the linear shaft portion 120. The end caps 122 are configured to be threadably mounted to the opposite sides of the linear shaft portion 120.

Referring to the embodiment as depicted in FIG. 5B, the end caps 122 are configured to restrict axial movement of the rigid flat plate members 104 along the axis of the linear shaft portion 120. This is done in such a way that the flat planar surface 110 is rotatable (pivotally rotatable) relative to the linear shaft portion 120 along a rotation plane. The instances of the flat planar surface 110 remain substantially in sliding contact arrangement with neighboring instances of the flat planar surface 110. The instances of the flat planar surface 110 remain in a stacked arrangement (one over the other, in contact arrangement relative to each other). Also, the rigid flat plate members 104 may be stacked one over the other (that is, the rigid flat plate members 104 do not fan out) so that they each share the same foot print (as depicted in FIG. 5B).

This written description uses examples to disclose the invention, including the best mode, and also to enable any person skilled in the art to make and use the invention. The patentable scope of the invention is defined by the claims, and may include other examples that occur to those skilled in the art. Such other examples are within the scope of the claims if they have structural elements that do not differ from the literal language of the claims, or if they include equivalent structural elements with insubstantial differences from the literal language of the claims.

It may be appreciated that the assemblies and modules described above may be connected with each other as required to perform desired functions and tasks within the scope of persons of skill in the art to make such combinations and permutations without having to describe each and every one in explicit terms. There is no particular assembly or component that may be superior to any of the equivalents available to the person skilled in the art. There is no particular mode of practicing the disclosed subject matter that is superior to others, so long as the functions may be performed. It is believed that all the crucial aspects of the disclosed subject matter have been provided in this document. It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) the description provided outside of this document (that is, outside of the instant application as filed, as prosecuted, and/or as granted). It is understood, for this document, that the phrase "includes" is equivalent to the word "comprising." The foregoing has outlined the non-limiting embodiments (examples). The description is made for particular non-limiting embodiments (examples). It is understood that the non-limiting embodiments are merely illustrative as examples.

What is claimed is:

1. A brake-shoe tool for use with a brake-shoe lining being configured to interact with a brake drum, the brake-shoe lining also being configured to be fixedly attachable to a brake shoe, the brake drum and the brake shoe being configured to be covered by a backing plate defining a backing plate inspection hole, the backing plate inspection hole being configured to expose, at least in part, a portion of the brake drum and the brake shoe, and the backing plate being included in a vehicle wheel having a vehicle tire being attached to a vehicle wheel rim of a movable vehicle, the brake-shoe tool comprising:
   an elongated rigid linear shaft assembly; and
   a plurality of rigid flat plate members each including:
      a bound end defining a shaft-receiving hole being configured to extend through the bound end, and the shaft-receiving hole of each instance of the bound end of the plurality of rigid flat plate members being configured to be aligned with each other in such a way that: (A) the elongated rigid linear shaft assembly is extendable through each instance of the shaft-receiving hole of each instance of the bound end once the shaft-receiving hole of said each instance of the bound end is aligned with each other; and (B) the plurality of rigid flat plate members is held in rotatable arrangement with the elongated rigid linear shaft assembly;
      a flat planar surface extending from the bound end, and the flat planar surface of each rigid flat plate member being in rotating contact arrangement with a neighboring instance of the flat planar surface once the instances of the bound end are rotatably mounted to the elongated rigid linear shaft assembly; and
      a free end extending from the flat planar surface, and the free end being spaced apart from the bound end, and each instance of the free end presenting an elongated edge having a unique predetermined length being different from unique predetermined lengths of remaining instances of the elongated edge, and each instance of the elongated edge being configured to be positioned adjacent to a thickness of the brake-shoe lining that is exposed by the backing plate inspection hole in such a way that each instance of the elongated edge is positionable to and visually comparable against the thickness of the brake-shoe lining while the vehicle wheel remains operatively attached to the vehicle wheel rim.

2. The brake-shoe tool of claim 1, wherein:
each member of the plurality of rigid flat plate members defines an L-shaped configuration.

3. The brake-shoe tool of claim 2, wherein:
the free end is configured to form a right-angled portion.

4. The brake-shoe tool of claim 3, wherein:
each instance of the flat planar surface includes:
   a unique indicia configured to indicate a unique length of the elongated edge of the free end.

5. The brake-shoe tool of claim 4, wherein:
the elongated rigid linear shaft assembly includes:
   a linear shaft portion with end caps being positioned on opposite sides of the linear shaft portion; and
   the end caps being configured to be threadably mounted to the opposite sides of the linear shaft portion.

6. The brake-shoe tool of claim 5, wherein:
the end caps are configured to restrict axial movement of the plurality of rigid flat plate members along an axis of the linear shaft portion in such a way that the flat planar surface is rotatable relative to the linear shaft portion along a rotation plane.

7. The brake-shoe tool of claim 6, wherein:
the instances of the flat planar surface remain substantially in sliding contact arrangement with neighboring instances of the flat planar surface.

8. The brake-shoe tool of claim 7, wherein:
the instances of the flat planar surface remain in a stacked arrangement one over the other, in contact arrangement relative to each other.

\* \* \* \* \*